(12) United States Patent
David et al.

(10) Patent No.: US 11,972,425 B1
(45) Date of Patent: Apr. 30, 2024

(54) SYSTEMS AND METHODS FOR ACCOUNT VERIFICATION

(71) Applicant: Wells Fargo Bank N.A., San Francisco, CA (US)

(72) Inventors: Daniel Alexander David, Charlotte, NC (US); Christina Zikeli, Charlotte, NC (US); Kellie L. Thomas, St. Johns, FL (US); Jeffrey A. Knight, Charlotte, NC (US); Todd Klapprodt, San Francisco, CA (US); Loftlon Worth, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 224 days.

(21) Appl. No.: 16/557,481

(22) Filed: Aug. 30, 2019

(51) Int. Cl.
G06Q 20/40 (2012.01)
G06Q 20/10 (2012.01)

(52) U.S. Cl.
CPC ....... *G06Q 20/4012* (2013.01); *G06Q 20/102* (2013.01); *G06Q 20/108* (2013.01)

(58) Field of Classification Search
None
See application file for complete search history.

(56) References Cited

U.S. PATENT DOCUMENTS

| | | | |
|---|---|---|---|
| 6,782,080 B2 | 8/2004 | Leivo et al. | |
| 8,639,623 B2 | 1/2014 | Kavanagh et al. | |
| 9,818,121 B2 | 11/2017 | Snyder et al. | |
| 10,134,015 B2 | 11/2018 | Kligman | |
| 11,042,863 B1 * | 6/2021 | Omojola | G06Q 20/40 |
| 2007/0244811 A1 * | 10/2007 | Tumminaro | G06Q 20/12 705/39 |
| 2008/0210751 A1 | 9/2008 | Kim | |

(Continued)

FOREIGN PATENT DOCUMENTS

WO  WO-2020028513 A1 *  2/2020 ......... G06Q 30/0185

OTHER PUBLICATIONS

"The New Real-Time Payments System for All Financial Institution" [online] [retrieved Nov. 6, 2019] Retrieved from Internet>https://www.theclearinghouse.org/payment-systems/rtp/ dated (Mar. 2019).

*Primary Examiner* — Chrystina E Zelaskiewicz
(74) *Attorney, Agent, or Firm* — K&L Gates LLP (57) ABSTRACT

Methods, apparatuses, and computer program products are disclosed for account verification. An example method includes receiving a request for payment transmission from a payment provider device and generating a first verification element for a payment destination device associated with the request for payment transmission. The method further includes transmitting the first verification element to the payment destination device via a first real-time payment message. In an instance in which the computing device receives responsive authorization from the payment destination device, the method includes verifying the payment destination device. In response to verifying the payment destination device, the method includes transmitting a first real-time payment to the payment destination device. In an instance in which the computing device fails to receive responsive authorization from the payment destination device, the method includes transmitting a verification failure notification to the payment provider device.

20 Claims, 5 Drawing Sheets

(56) References Cited

U.S. PATENT DOCUMENTS

| | | |
|---|---|---|
| 2008/0270246 A1 | 10/2008 | Chen |
| 2011/0078025 A1 | 3/2011 | Shrivastav |
| 2013/0060708 A1* | 3/2013 | Oskolkov ............. G06Q 20/10 705/42 |
| 2015/0310404 A1* | 10/2015 | Dorsey ................ G06Q 20/023 705/42 |
| 2017/0024744 A1 | 1/2017 | Finch et al. |
| 2017/0200137 A1* | 7/2017 | Vilmont ............. G06Q 30/0213 |
| 2017/0308875 A1* | 10/2017 | O'Regan ................ G06Q 20/40 |
| 2018/0152429 A1* | 5/2018 | Segal .................... H04L 9/3213 |
| 2018/0264347 A1* | 9/2018 | Tran ....................... A63B 69/38 |

\* cited by examiner

SYSTEMS AND METHODS FOR ACCOUNT VERIFICATION

TECHNOLOGICAL FIELD

Example embodiments of the present invention relate generally to payment transmission and, more particularly, to the use of real-time payments for account verification.

BACKGROUND

Businesses and users often transmit and receive funds for items, services, and the like that they provide and/or receive. In order to complete these financial transactions, account or other relevant information for the sender and recipient are often necessary. Failure to accurately provide relevant account information by either party to the transaction may result in misdirected funds, payment failure, or the like.

BRIEF SUMMARY

A growing issue with financial transactions, especially in the context of irrevocable payments, is ensuring the accuracy of the destination account. In an example real-time payment (RTP) transaction, a user may incorrectly input a destination account number, phone number, or other account information such that the funds are transmitted to the wrong account. Unlike traditional payment methods (e.g., credit card payments, debit card payments, automated clearing house (ACH) payments, wire payments, etc.) in which these funds may be returned, halted, or the like, the irrevocability of RTPs results in misdelivered funds that are significantly more difficult to return. Conventional attempts at verifying destination accounts have relied upon micro-transactions (e.g., $0.02) that are deposited in a destination account and subsequently verified by the owner of the destination account. These traditional deposits, however, may take several days to complete and require that a user manually confirm the amount of the deposits.

To solve these issues and others, example implementations of embodiments of the present invention may utilize irrevocable, real-time payments to instead exchange nonfinancial information in an RTP message in order to verify a destination account. In operation, embodiments of the present disclosure may receive a request for payment transmission from a payment provider device and generate a first verification element for a payment destination device associated with the request for payment transmission. These embodiments may further transmit the first verification element to the payment destination device via a first real-time payment message, and, in an instance in which the computing device receives responsive authorization from the payment destination device, may verify the payment destination device in an instance in which the computing device receives responsive authorization from the payment destination device. In this way, the inventors have identified that the advent of new payment technologies have created a new opportunity for solutions for verifying accounts which were historically unavailable. In doing so, such example implementations confront and solve at least two technical challenges: (1) they exchange nonfinancial information to eliminate payment for verification, and (2) they reliably verify payment destination accounts.

Systems, apparatuses, methods, and computer program products are disclosed herein for account verification. In one embodiment, with reference to the claimed method, a method for account verification may include receiving, via a computing device, a request for payment transmission from a payment provider device. The method may include generating, via account identification circuitry of the computing device, a first verification element for a payment destination device associated with the request for payment transmission. The method may further include transmitting, via payment circuitry of the computing device, the first verification element to the payment destination device via a first real-time payment message. In an instance in which the computing device receives responsive authorization from the payment destination device, the method may include verifying, via the account identification circuitry of the computing device, the payment destination device.

In some embodiments, in response to verifying the payment destination device, the method may include transmitting, via the payment circuitry of the computing device, a first real-time payment to the payment destination device.

In other embodiments, the method may include transmitting, via the payment circuitry of the computing device, a verification failure notification to the payment provider device in an instance in which the computing device fails to receive responsive authorization from the payment destination device.

In some embodiments, generating the first verification element may include querying, via the account identification circuitry of the computing device, an account information database storing one or more account parameters. In such an embodiment, the method may include generating, via the account identification circuitry of the computing device, the first verification element based on the account parameters.

In other embodiments, the method may include receiving, via contextual analysis circuitry of the computing device, one or more first contextual parameters of the payment provider device, and receiving, via the contextual analysis circuitry of the computing device, one or more second contextual parameters of the payment destination device. In such an embodiment, the method may further include generating, via the account identification circuitry of the computing device, the verification element based on the first contextual parameters and the second contextual parameters.

In some embodiments, in response to verifying the payment destination device, the method may include generating, via the account identification circuitry of the computing device, a second verification element for the payment provider device. In such an embodiment, the method may further include transmitting, via payment circuitry of the computing device, the second verification element to the payment provider device via a second real-time payment message.

In some cases, the method may further include verifying, via the account identification circuitry of the computing device, the payment provider device in an instance in which the computing device receives responsive authorization from the payment provider device. In response to verifying the payment provider device, the method may also include transmitting, via the payment circuitry of the computing device, a first real-time payment to the payment destination device.

In some embodiments, the method may further include transmitting, via the payment circuitry of the computing device, a verification failure notification to the payment destination device in an instance in which the computing device fails to receive responsive authorization from the payment provider device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a real-time payment server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a real-time payment server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the real-time payment server 200 or other computing devices via a network.

As used herein, the term "payment provider device" refers to any object, user device, or system which may be in network communication with the real-time payment server, and/or the payment destination device. For example, a payment provider device may be a mobile device or other computing device that may request, receive, and/or provide data to or from one of the devices described above. By way of example, a payment provider device may be a mobile device associated with a user configured to transmit or otherwise enact a request for payment transmission (e.g., a device associated with a user intending to transmit payment to a payment destination device).

As used herein, the term "payment destination device" refers to any object, user device, or system which may be in network communication with the real-time payment server, and/or the payment provider device. For example, a payment destination device may be a mobile device or other computing device that may request, receive, and/or provide data to or from one of the devices described above. By way of example, a payment destination device may be a mobile device associated with a user configured to receive a verification element and transmit responsive authorization in order to receive a payment transmission (e.g., a device associated with a user intending to receive payment from the payment provider device).

As used herein, the term "account information database" refers to a data structure or repository for storing user data, account parameters, and the like. Similarly, the "account parameters" of the account information database may refer to data generated by or relevant to a user device and associated user (e.g., account data, transaction data, biometric data, purchase data, billing data, mobile device data, or the like). The account information database may be accessible by one or more software applications of the real-time payment server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, description is made to a "real-time payment" transmission or transaction initiated or otherwise caused by the embodiments of the present disclosure. A real-time payment may refer to a substantially simultaneous transfer of irrevocable funds from a sender to a recipient. While described herein as substantially simultaneous or occurring in "real-time," the present disclosure contemplates that a real-time payment may practically occur over a time frame of several seconds (e.g., or any duration). In some instances, a real-time payment may require additional time (e.g., in order to verify a destination device or account, due to system volume or other technological limitations, etc.) such that the completed transfer of funds requires several minutes or hours. In any event, a real-time payment as described herein refers to an irrevocable transfer of funds at a speed that is substantially faster than traditional payments methods. Additionally, a real-time payment may also refer to a transfer of irrevocable funds that may be immediately accessible and usable by a recipient. Unlike conventional payment methods that may appear in a user's account (e.g., as a memo-credit or the like) but cannot be used, funds transferred via a real-time payment may be immediately useable by a recipient.

Furthermore, the present disclosure acknowledges that a real-time payment system or RTP® may refer to a particular payment network or digital commerce system owned by The Clearing House (TCH). The embodiments of the present disclosure, however, do not refer to or require a particular payment network or digital commerce system and, instead, refer to the substantially simultaneous and irrevocable transfer of funds as described above.

Having set forth a series of definitions called-upon throughout this application, an example system architecture and example apparatus is described below for implementing example embodiments and features of the present disclosure.

Device Architecture and Example Apparatus

Figure 1:
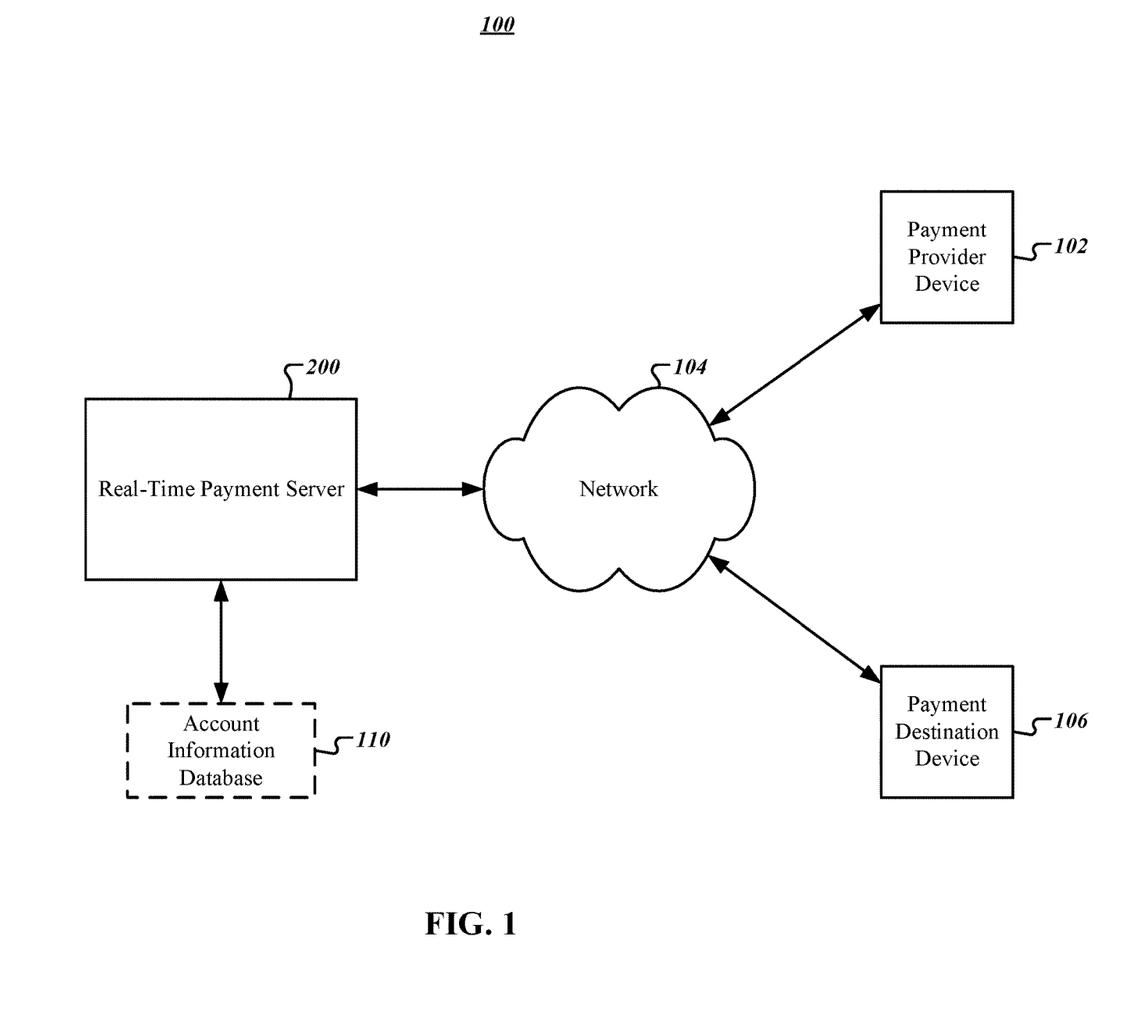
FIG. 1 illustrates a system diagram including devices that may be involved in some example embodiments described herein.

With reference to FIG. 1, an example system 100 is illustrated with an apparatus (e.g., a real-time payment server 200) communicably connected via a network 104 to a payment provider device 102 and a payment destination device 106. The example system 100 may also include an account information database 110 that may be hosted by the real-time payment server 200 or otherwise hosted by devices in communication with the real-time payment server 200.

The real-time payment server 200 may include circuitry, networked processors, or the like configured to perform some or all of the apparatus-based (e.g., real-time payment server-based) processes described herein, and may be any suitable network server and/or other type of processing device. In this regard, real-time payment server 200 may be embodied by any of a variety of devices. For example, the real-time payment server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith.

In some embodiments, the real-time payment server 200 may be located remotely from the payment provider device 102, the payment destination device 106, and/or account information database 110, although in other embodiments, the real-time payment server 200 may comprise the payment destination device 106, the payment provider device 102, and/or the account information database 110. The real-time payment server 200 may, in some embodiments, comprise several servers or computing devices performing interconnected and/or distributed functions. Despite the many arrangements contemplated herein, the real-time payment server 200 is shown and described herein as a single computing device to avoid unnecessarily overcomplicating the disclosure. In some embodiments, the payment destination device 106 may include the payment provider device 102. For example, the payment provider device 102 may be associated with a financial institution, and the payment destination device 106 may be associated with a user's account in the financial institution. In such an embodiment, a request for payment transmission may instead refer to an internal request of the financial institution (e.g., the payment provider device 102) to transmit funds to an account within the financial institution (e.g., a dividend payment or the like).

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The payment provider device 102 may refer to a user device associated with a first user or entity and may be a cellular telephone (e.g., a smartphone and/or other type of mobile telephone), laptop, tablet, electronic reader, e-book device, media device, wearable, smart glasses, smartwatch, or any combination of the above. Similarly, the payment destination device 106 may refer to a user device associated with a second user or entity and may also be a cellular telephone (e.g., a smartphone and/or other type of mobile telephone), laptop, tablet, electronic reader, e-book device, media device, wearable, smart glasses, smartwatch, or any combination of the above. Although only a payment provider device 102 and a payment destination device 106 are illustrated, the example system 100 may include any number of devices associated with the same user or any number of respective other users.

The account information database 110 may be stored by any suitable storage device configured to store some or all of the information described herein (e.g., memory 204 of the real-time payment server 200 or a separate memory system separate from the real-time payment server 200, such as one or more database systems, backend data servers, network databases, cloud storage devices, or the like provided by another device (e.g., online application or 3r d party provider) or the payment provider device 102/payment destination device 106). The account information database 110 may comprise data received from the real-time payment server 200 (e.g., via a memory 204 and/or processor(s) 202), the payment destination device 106, or the payment provider device 102, and the corresponding storage device may thus store this data.

Figure 2:
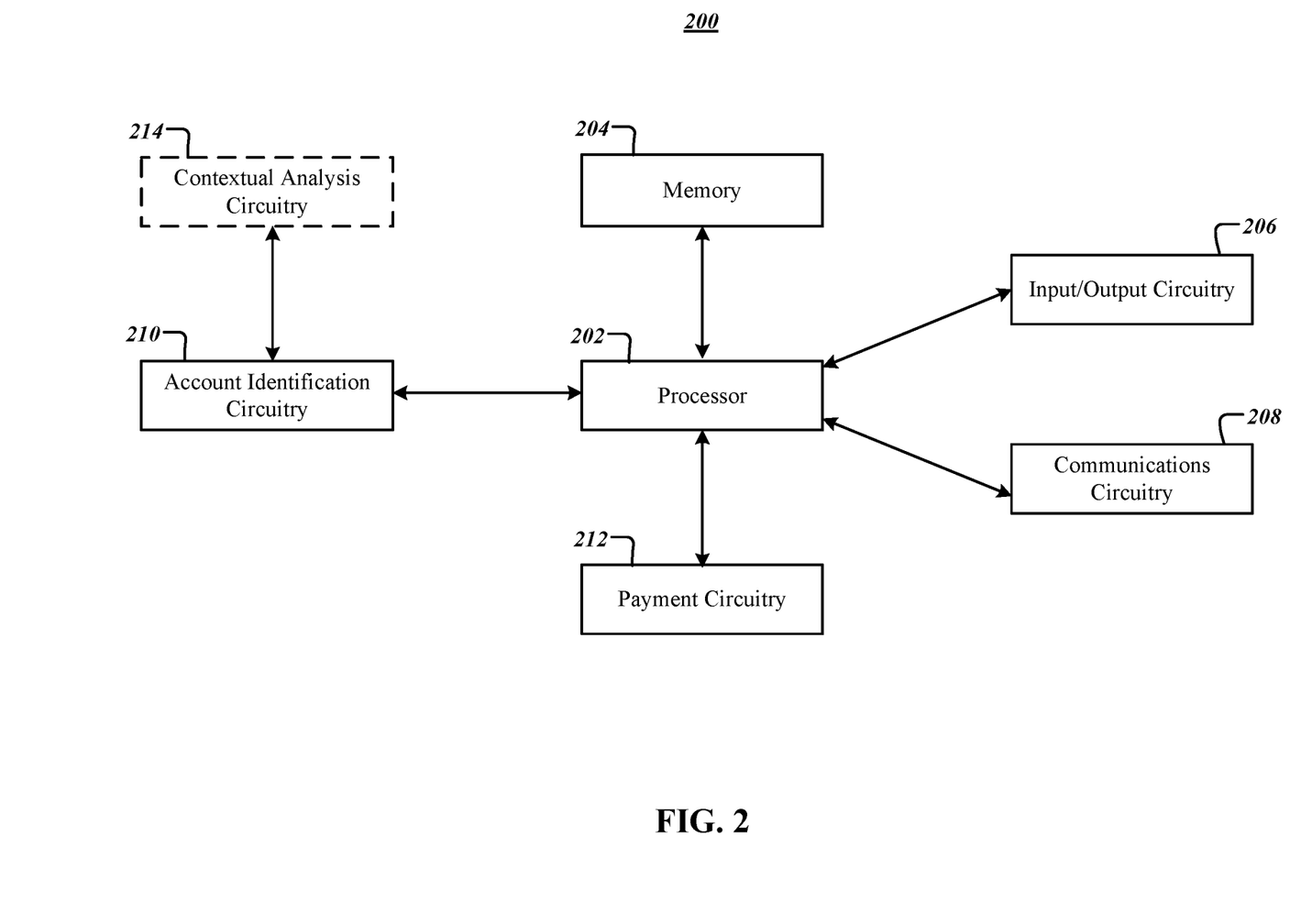
FIG. 2 illustrates a schematic block diagram of example circuitry that may perform various operations, in accordance with some example embodiments described herein.

As illustrated in FIG. 2, the real-time payment server 200 may include a processor 202, a memory 204, communications circuitry 208, and input/output circuitry 206. Moreover, the real-time payment server 200 may include account identification circuitry 210, payment circuitry 212, and, in some embodiments, contextual analysis circuitry 214. The real-time payment server 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the real-time payment server 200 may be housed within the payment destination device 106 and/or the payment provider device 102. It will be understood in this regard that some of the components described in connection with the real-time payment server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the real-time payment server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the real-time payment server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the real-time payment server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the real-time payment server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The real-time payment server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the real-time payment server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the real-time payment server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The account identification circuitry 210 includes hardware components designed to generate a verification element for a payment destination device associated with a request for payment transmission. The payment circuitry 212 may be configured to, in an instance in which the real-time payment server 200 receives responsive authorization from a user device (e.g., payment destination device 106), verify the payment destination device 106. The account identification circuitry 210 may utilize processing circuitry, such as the processor 202, to perform its corresponding operations, and may utilize memory 204 to store collected information. By way of example, in some instances, the account identification circuitry 210 may query the account information database 110 to receive one or more account parameters. The account identification circuitry 210 may generate the verification element based on the account parameters. In some embodiments, the account identification circuitry 210 may further comprise contextual analysis circuitry 214. The contextual analysis circuitry 214 may be configured to receive contextual parameters associated with user devices (e.g., payment provider device 102 and/or payment destination device 106). The contextual analysis circuitry 214 may further be configured to generate the verification element based on the first contextual parameters and the second contextual parameters.

The payment circuitry 212 includes hardware components designed to generate and transmit real-time payments. Furthermore, the payment circuitry 212 may be configured to generate a real-time payment message as described hereafter that includes the verification element generated by the account identification circuitry 210. The payment circuitry 212 may utilize processing circuitry, such as the processor 202, to perform its corresponding operations, and may utilize memory 204 to store collected information.

It should also be appreciated that, in some embodiments, the account identification circuitry 210, payment circuitry 212, and/or contextual analysis circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of real-time payment server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Account Verification

Figure 3:
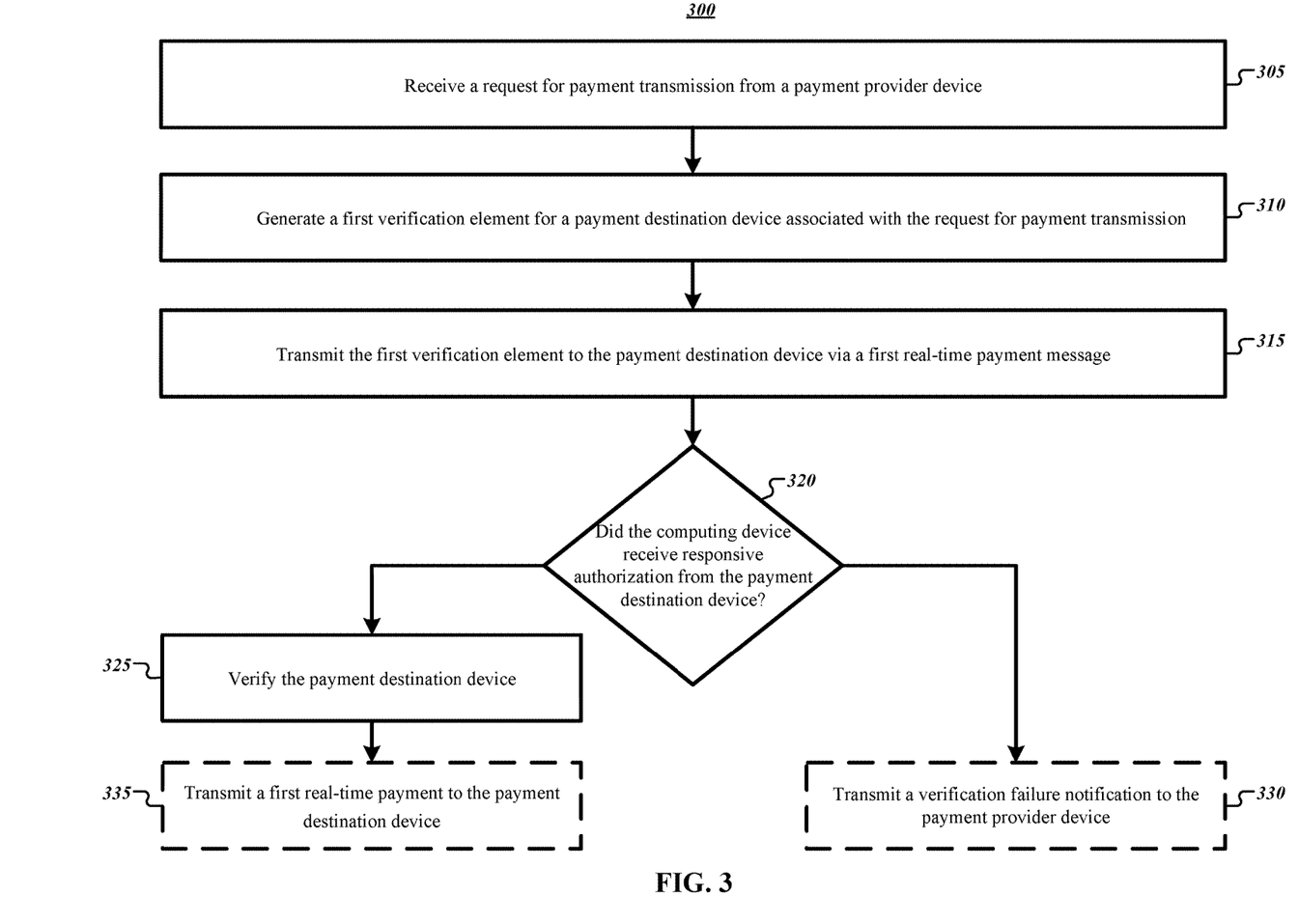
FIG. 3 illustrates an example flowchart for account verification, in accordance with some example embodiments described herein.

FIG. 3 illustrates a flowchart containing a series of operations for account verification. The operations illustrated in FIG. 3 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, account identification circuitry 210, payment circuitry 212, and/or contextual analysis circuitry 214.

As shown in operation 305, the apparatus (e.g., real-time payment server 200) includes means, such as input/output circuitry 206, communications circuitry 208, or the like, for receiving a request for payment transmission from a payment provider device 102. In some example embodiments, the communications circuitry 208 may receive a request for payment from the payment provider device 102 that includes information regarding a payment destination device 106. In such an embodiment, the request for payment may include account details (e.g., user name, user account information, user address, etc.) associated with the payment destination device 106 (e.g., and an associated user). In other embodiments, the communications circuitry 208 may receive a request for payment transmission from the payment provider device 102 that does not include necessary information regarding the payment destination device 106 and associated user. As described above, in some embodiments, the payment destination device 106 may include the payment provider device 102. In such an embodiment, the request for payment transmission at operation 305 may refer to an internal request of the payment provider device 102 (e.g., a financial institution) to transmit funds to the payment destination device 106 (e.g., an account within the financial institution).

By way of example, the payment provider device 102 may be associated with a first user that is aware of one or more account parameters (e.g., a phone number, name, account number, etc.) of the payment destination device 106 such that the request for payment transmission may include this account information associated with the payment destination device 106. In particular, the payment provider device 102 may, from a prior request for payment (e.g., a prior transaction between the payment provider device 102 and the payment destination device 106), relationship between the transaction parties (e.g., a personal relationship between the users associated with the payment provider device 102 and the payment destination device 106), or the like, such that the request for payment transmission may contain account information associated with the payment destination device 106.

In an alternative embodiment, the payment provider device 102 may not have sufficient account information for the payment destination device 106 and associated user. By way of example, the request for payment transmission at operation 305 may be the first requested transaction between the payment provider device 102 and the payment destination device 106. Similarly, the relationship between the transaction parties (e.g., a lack of personal relationship between the users associated with the payment provider device 102 and the payment destination device 106) may be such that the payment provider device 102 may only have access to the user's phone number, the user's name, or the like. While described herein with reference to a payment provider device 102 and a payment destination device 106, the present disclosure contemplates that either device may operate to initiate the request for payment transmission (e.g., the payment destination device 106 may, in some instances, act as the payment provider device 102).

Thereafter, as shown in operation 310, the apparatus (e.g., real-time payment server 200) includes means, such as input/output circuitry 206, account identification circuitry 210, contextual analysis circuitry 214, or the like, generating a first verification element for a payment destination device 106 associated with the request for payment transmission. As described above, the payment destination device 106 may be communicably coupled with the payment provider device 102 via the network 104 such that the payment provider device 102 may be configured to initiate a real-time payment transaction between the payment provider device 102 and the payment destination device 106 (e.g., a financial transfer of funds from the payment provider device 102 to the payment destination device 106). By way of example, a user associated with the payment provider device 102 may receive a service, item, good, etc. from a user associated with the payment destination device 106. In order to satisfy any obligation (e.g., pay for) the service, item, good, or the like, the payment provider device 102 may initiate a real-time payment transfer to the payment destination device 106. To facilitate this financial transaction and verify the payment destination device 106, as described hereafter with reference to FIG. 4, the real-time payment server 200 may be configured to generate a first verification element for the payment destination device 106 by receiving identifying user data from the payment provider device 102 with the request for payment transmission as described above with reference to operation 305 and/or may query an account information database 110 as described hereafter.

The verification element as described herein with reference to operation 310 may refer to any element, feature, message, or the like that may be received by the payment destination device 106 and, via responsive authorization as described hereafter, used to verify the payment destination device 106. By way of example, in some embodiments, the verification element generated at operation 310 may include instructions for provide a message (e.g., text message, email message, account notification message, banner notification message, etc.) to the user associated with the payment destination device 106. Said differently, the verification element (as transmitted by the RTP message described hereafter) may further include instructions for displaying, for example, a banner notification to the user's mobile phone (e.g., payment destination device 106).

In some further embodiments, the verification element may include instructions for providing one or more inputs for user response. For example, the verification element may, in some embodiments, include instructions for providing a text message transmitted by the real-time payment server 200 (e.g., as facilitated by the RTP message) to the payment destination device 106 that includes a responsive payment input (e.g., payment link, input button, etc.) configured to verify the payment destination device 106 so as to receive a real-time payment. In some embodiments, the verification element may include a plurality of user inputs. In such an embodiment, the plurality of user inputs may include options for verifying the payment destination device 106. For example, the one or more user input options may request confirmation from the user associated with the payment destination device 106 (e.g., "are you expecting an RTP payment," "did you sell an item to John Smith," or the like).

In some still further embodiments, the verification element generated at operation 310 may further include instructions for requesting one or more biometric inputs. By way of continued example, the verification element may, in some embodiments, include instructions for providing a text message transmitted by the real-time payment server 200 (e.g., as facilitated by the RTP message) to the payment destination device 106 that includes a biometric input configured to request one or more biometric parameters of the user associated with the payment destination device 106. In particular, the verification element generated at operation 310 may include instructions to request a thumbprint scan. While described herein with reference to a thumbprint scan, the present disclosure contemplates that any biometric information (e.g., ocular scan, facial recognition, speech recognition, liveness detection, or the like) may be used in conjunction with the verification elements described herein.

Thereafter, as shown in operation 315, the apparatus (e.g., real-time payment server 200) includes means, such as processor 202, payment circuitry 212, or the like, for transmitting the first verification element to the payment destination device 106 via a first real-time payment message. As described above, the methods of the present application may utilize irrevocable, real-time payments to instead exchange nonfinancial information in an RTP message in order to verify the payment destination device 106. The advent of RTP transactions have provided more robust data transmission capabilities than those of conventional payment methods. As such, the method of the present application at operation 315 may transmit the first verification element (e.g., instructions to provide a message, biometric input, or the like) via the transmission of a first real-time payment message to the payment destination device 106. In this way, the real-time payment message exchanges nonfinancial information (e.g., without micro-deposits or transactions) between the payment provider device 102 and the payment destination device 106.

As described above, in some embodiments, the request for payment transmission received from the payment provider device 102 at operation 305 may include data identifying the payment destination device 106 (e.g., account information, user address, etc.). In such an embodiment, the request for payment transmission may include or otherwise facilitate generation of a first verification element for transmission to the payment destination device 106. For example, the payment provider device 102 may prepare a first verification element (e.g., a banner notification including the amount of the initiated real-time payment and/or the user associated with the real-time payment) based upon user data, account parameters, or the like associated with the payment destination device 106 (e.g., user name, address, account information, etc.). In such an embodiment, the real-time payment server 200 may receive the request for payment transmission and verification element and transmit the verification element to to the payment destination device 106 via the real-time payment message.

In some instances, however, the request for payment transmission from the payment provider device 102 may not include the requisite user information to generate a first verification element. As such, the real-time payment server 200 may, as described hereafter with reference to FIG. 4, generate a first verification element for a payment destination device 106 associated with the request for payment transmission. For example, the real-time payment server 200 may analyze one or more contextual parameters of the payment destination device 106 or the payment provider device 102 (e.g., location data, device proximity data, internet protocol (IP) data, or the like) to generate the first verification element.

Thereafter, as shown in operation 320, the apparatus (e.g., real-time payment server 200) includes means, such as the processor 202, the communications circuitry 208, or the like, or the like, for determining if the real-time payment server 200 received a responsive authorization from the payment destination device 106. In some embodiments the verification element (transmitted via the RTP message) may include an input option that, when selected, transmits an instruction that refuses verification. By way of example, the user associated with the payment destination device 106 may not recognize or approve the initiated real-time payment, payment provider device 102, or the like. In such an embodiment, the real-time payment server 200 may receive explicit instructions refusing to authorize a real-time payment and proceed to operation 330 as described hereafter. In other embodiments, the verification element may only include an option to authorize the real-time payment and/or a user associated with the payment destination device 106 may fail to take any action (e.g., fail to respond to the verification element and RTP message). In such an embodiment, the real-time payment server 200 may, following the expiration of a response time period, proceed to operation 330 as described hereafter.

In some embodiments, as shown in operation 325, the apparatus (e.g., real-time payment server 200) includes means, such as processor 202, memory 204, account identification circuitry 210, or the like, for verifying the payment destination device 106. As described above, in an instance in which the real-time payment server 200 receives a responsive authorization from the payment destination device 106, the real-time payment server 200 may verify the payment destination device 106 (e.g., verify that the payment destination device 106 corresponds to the intended recipient of the payment transmission at operation 305) and proceed to operation 335 as described hereafter. In some embodiments, upon verifying the payment destination device 106, the real-time payment server 200 may transmit a notification (e.g., cause transmission of a notification) to the payment provider device 102 indicative of this verification.

In some further embodiments, as shown in operation 335, the apparatus (e.g., real-time payment server 200) includes means, such as processor 202, memory 204, payment circuitry 212, or the like for transmitting (e.g., or causing transmission of) a real-time payment to the payment destination device 106. Based upon the input from the user associated with the payment destination device 106, the type of verification element, etc., the real-time payment server 200 may, in some embodiments, transmit a real-time payment to the payment destination device 106 in accordance with request for payment transmission received at operation 305. As would be evident to one of ordinary skill in the art in light of the present disclosure, the real-time payment may serve as an instantaneous and irrevocable payment to the payment destination device 106, verified via nonfinancial information exchange.

In an instance in which the real-time payment server 200 fails to receive responsive authorization from payment destination device, as shown in operation 330, the apparatus (e.g., real-time payment server 200) includes means, such as processor 202, communications circuitry 208, payment circuitry 212, or the like, for transmitting a verification failure notification to the payment provider device 102. By way of example, in some embodiments, the real-time payment server 200 may transmit a verification failure notification with instructions to the payment provider device 102 requesting additional or corrected user information or account parameters (e.g., in an instance in which incorrect account information is provided). By way of example, in an instance in which the request for payment transmission from the payment provider device 102 includes an incorrect user phone number, the payment destination device 106 (e.g., not the intended destination device) may receive a verification element and fail to transmit a responsive authorization. In such an embodiment, the payment circuitry 212 may transmit a verification failure notification at operation 330 that may, in some embodiments, request additional information (e.g., account parameters of the intended payment destination device 106).

Figure 4:
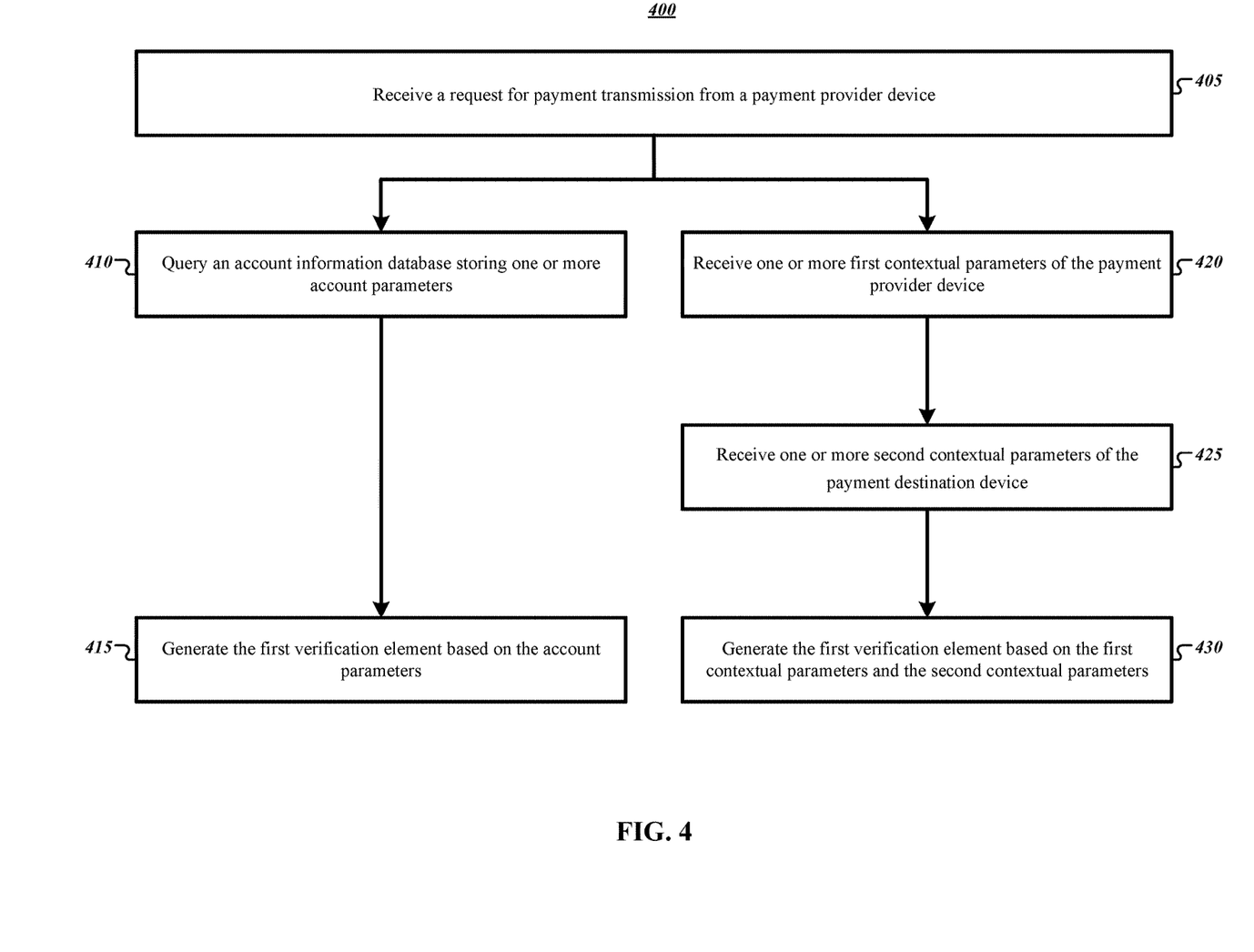
FIG. 4 illustrates an example flowchart for generating a verification element, in accordance with some example embodiments described herein.

Turning next to FIG. 4, a flowchart is shown for generating a verification element. The operations illustrated in FIG. 4 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, account identification circuitry 210, payment circuitry 212, and/or contextual analysis circuitry 214.

As shown in operation 405, the apparatus (e.g., real-time payment server 200) includes means, such as input/output circuitry 206, communications circuitry 208, or the like, for receiving a request for payment transmission from a payment provider device 102. As described above with reference to FIG. 3, the communications circuitry 208 may receive a request for payment transmission from the payment provider device 102 that includes information regarding a payment destination device 106. In some embodiments, the request for payment transmission may include account details (e.g., user name, user account information, user address, etc.) associated with the payment destination device 106 (e.g., and an associated user). In other embodiments, the communications circuitry 208 may receive a request for payment transmission from the payment provider device 102 that does not include sufficient information regarding the payment destination device 106.

Thereafter, as shown in operations 410, 415 the apparatus (e.g., real-time payment server 200) includes means, such as processor 202, account identification circuitry 210, or the like, for querying an account information database 110 storing one or more account parameters and identifying the payment destination device 106 based upon the one or more account parameters. As described above, in some embodiments, the request for payment transmission received at operation 405 may include account information associated with the payment destination device 106. By way of example, the request for payment transmission may include, from a prior request for payment (e.g., a prior transaction between the payment provider device 102 and the payment destination device 106), a relationship between the transaction parties (e.g., a personal relationship between the users associated with the payment provider device 102 and the payment destination device 106), or the like, such that the account identification circuitry 210 may identify the payment destination device 106 based upon the request for payment transmission. In other embodiments, however, the request for payment transmission may not provide necessary information related to the payment destination device 106 and associated user. As such, the real-time payment server 200 may query an account information database 110 storing one or more account parameters.

By way of example, request for payment transmission may only identify a portion of the information associated with the user of the payment destination device 106 (e.g., a phone number associated with the payment destination device 106). As such, the account identification circuitry 210 may query the account information database 110 to access and retrieve one or more account parameters. The one or more account parameters may include usernames, account locations, billing information, or the like. By way of a more particular example, the account identification circuitry 210 may query the account information database 110 (e.g., or other data repository, Zelle®, EWS, or the like) to identify an account associated with the payment destination device 106 in an associated financial institution. Based upon the account information for the payment destination device 106 and associated user (e.g., account numbers, user phone numbers, user emails, etc.), the account identification circuitry 210 may generate the first verification element based on the account parameters at operation 415. As such, the first verification element as described above may be transmitted to the payment destination device 106 as any form of communication (e.g., text message, banner notification, or the like) based upon the intended application, priority, etc.

In some instances, however, the request for payment transmission from the payment provider device 102 may not include the requisite user information or the account information database 110 described above and may not include adequate user information to generate the first verification element. As such, the apparatus (e.g., real-time payment server 200) includes means, such as processor 202, account identification circuitry 210, contextual analysis circuitry 214, or the like, for receiving one or more contextual parameters (e.g., location data, device proximity data, internet protocol (IP) data, or the like) of the payment provider device 102 at operation 420 and receiving one or more second contextual parameters (e.g., location data, device proximity data, internet protocol (IP) data, or the like) of the payment destination device 106 at operation 425.

By way of example, the contextual analysis circuitry 214, in some embodiments, may receive contextual parameters associated with the location data of the payment provider device 102 and/or the payment destination device 106 at operations 420, 425. By way of example, the real-time payment server 200 may receive location data from the payment destination device 106 (e.g., global positioning system (GPS) data from a mobile device, an internet protocol (IP) address of the mobile device, etc.) and from the payment provider device 102 (e.g., with the request for payment transmission or otherwise) and compare the respective locations of the payment destination device 106 and the payment provider device 102. In an instance in which the location data of the payment destination device 106 sufficiently corresponds to the location of the payment provider device 102 (e.g., within one or more proximity thresholds), the account identification circuitry 210 may generate the verification element based on the first contextual parameters and the second contextual parameters (e.g., location data) at operation 430. Said differently, the account identification circuitry 110 may, in such an embodiment, receive the necessary account information or parameters for generating a first verification element from the proximate payment destination device 106 and the payment provider device 102.

As would be evident to one of ordinary skill in the art in light of the present disclosure, instances in which the contextual analysis circuitry 214 relies upon location data of the payment destination device 106 and the payment provider device 102 may be limited to instances in which the user devices are physically present during a transaction. As such, the embodiments of the present application contemplate that any contextual parameters of the payment destination device 106 and the payment provider device 102 may be used by the real-time payment server 200 based upon the intended application.

Figure 5:
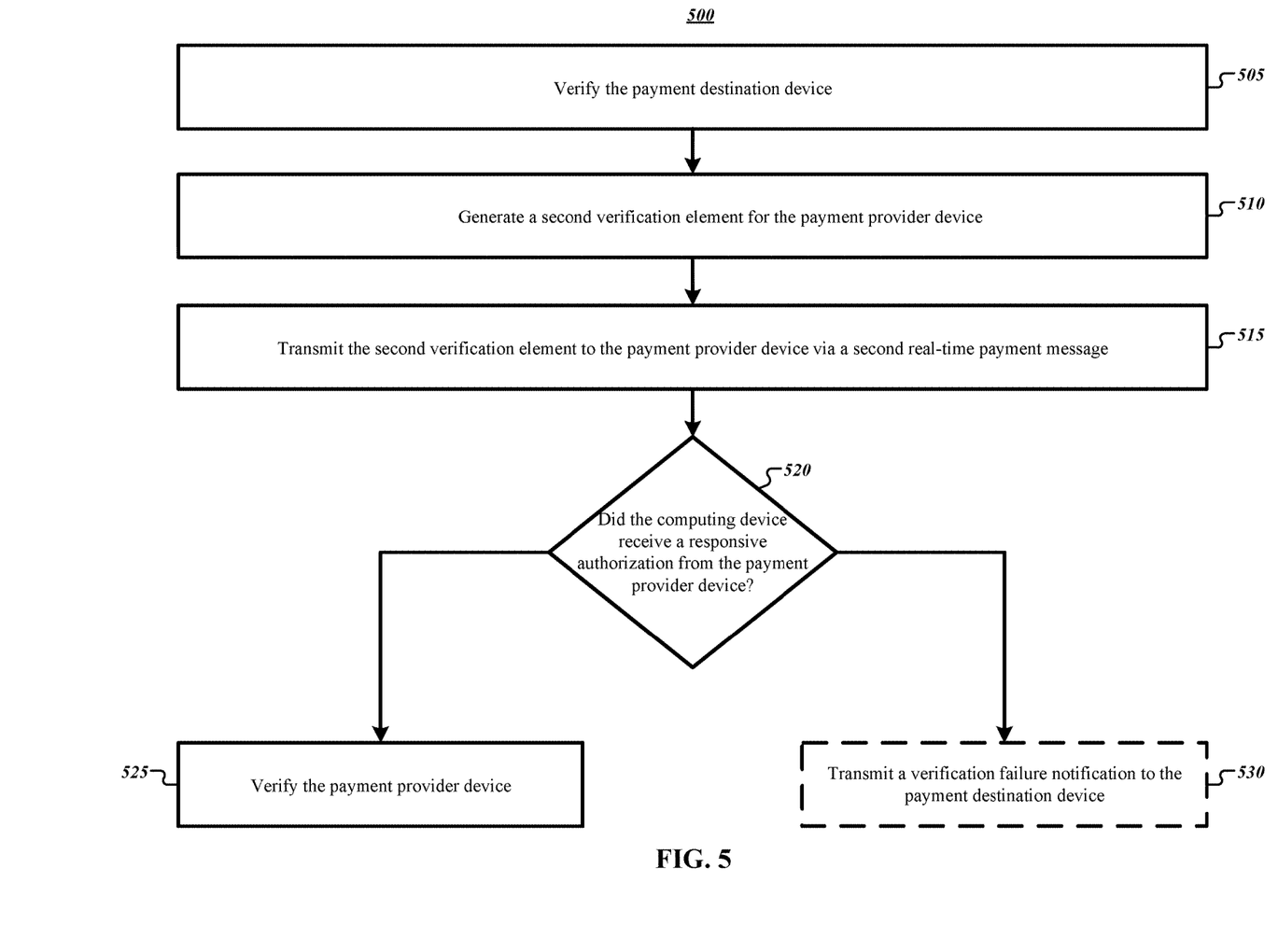
FIG. 5 illustrates an example flowchart for mutual verification, in accordance with some example embodiments described herein.

Turning next to FIG. 5, a flowchart is shown for mutual verification. The operations illustrated in FIG. 5 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, account identification circuitry 210, payment circuitry 212, and/or contextual analysis circuitry 214.

As shown in operation 505, the apparatus (e.g., real-time payment server 200) includes means, such as input/output circuitry 206, communications circuitry 208, or the like, for verifying the payment destination device 106. As described above with reference to operation 325, in an instance in which the real-time payment server 200 receives a responsive authorization from the payment destination device 106, the real-time payment server 200 may verify the payment destination device 106 (e.g., verify that the payment destination device 106 corresponds to the intended recipient of the payment transmission at operation 305). In some embodiments, upon verifying the payment destination device 106, the real-time payment server 200 may transmit a notification (e.g., cause transmission of a notification) to the payment provider device 102 indicative of this verification. As would be evident to one of ordinary skill in the art in light of the present disclosure, the payment destination device 106 may further intend to verify the payment provider device 102. By way of example, the payment destination device 106 may receive a verification element via an RTP message initiating a transfer of funds to the payment destination device 106 (e.g., an account associated with the payment destination device 106 and associated user). The payment destination device 106 and associated user, however, may be wary of such a transaction (e.g., due to potential fraud, money laundering, etc.), and may request mutual verification (e.g., verification of the payment provider device 102) as described hereafter.

Thereafter, as shown in operation 510, the apparatus (e.g., real-time payment server 200) includes means, such as the processor 202, the payment circuitry 212, or the like, or the like, for generating a second verification element for the payment provider device. As described above with reference to operation 310, the second verification element may refer to any element, feature, message, or the like that may be received by the payment provider device 102 and, via responsive authorization as described hereafter, used to verify the payment provider device 102. By way of example, in some embodiments, the verification element generated at operation 510 may include instructions for providing a message (e.g., text message, email message, account notification message, banner notification message, etc.) to the user associated with the payment provider device 102. Said differently, the verification element (as transmitted by the RTP message described hereafter) may further include instructions for displaying, for example, a banner notification to the user's mobile phone (e.g., payment provider device 102). As described above, the verification element may include instructions for providing one or more inputs for user response and may further include instructions for requesting one or more biometric inputs.

Thereafter, as shown in operation 515, the apparatus (e.g., real-time payment server 200) includes means, such as processor 202, payment circuitry 212, or the like, for transmitting the second verification element to the payment provider device 102 via a second real-time payment message. As described above with reference to operation 315, the methods of the present application may also utilize irrevocable, real-time payments to instead exchange nonfinancial information in an RTP message in order to provide mutual verification (e.g., verification of the payment provider device 102). The advent of RTP transactions have provided more robust data transmission capabilities than those of conventional payments. As such, the method of the present application at operation 515 may transmit the second verification element (e.g., instructions to provide a message, biometric input, or the like) via the transmission of a second real-time payment message to the payment provider device 102. In this way, the second real-time payment message also exchanges nonfinancial information (e.g., without microdeposits or transactions) between the payment destination device 106 and the payment source device 102.

Thereafter, as shown in operation 520, the apparatus (e.g., real-time payment server 200) includes means, such as the processor 202, the communications circuitry 208, or the like, or the like, for determining if the real-time payment server 200 received a responsive authorization from the payment provider device 102. In some embodiments the second verification element (transmitted via the second RTP message) may include an input option that, when selected, transmits an instruction that refuses verification. By way of example, the user associated with the payment provider device 102 may not recognize or approve the initiated real-time payment, payment destination device 106, or the like (e.g., the payment provider device 102 provided incorrect account information initially). In such an embodiment, the real-time payment server 200 may receive explicit instructions refusing to authorize a real-time payment and proceed to operation 530 as described hereafter. In other embodiments, the second verification element may only include an option to authorize the real-time payment and/or a user associated with the payment provider device 102 may fail to take any action (e.g., fail to respond to the second verification element and second RTP message). In such an embodiment, the real-time payment server 200 may, following the expiration of a response time period, proceed to operation 530 as described hereafter.

In some embodiments, as shown in operation 525, the apparatus (e.g., real-time payment server 200) includes means, such as processor 202, memory 204, account identification circuitry 210, or the like, for verifying the payment provider device 102. As described above, in an instance in which the real-time payment server 200 receives a responsive authorization from the payment provider device 102, the real-time payment server 200 may verify the payment provider device 102 (e.g., verify that the payment provider device 102 corresponds to the intended provider of the payment transmission) at operation 505 and proceed to operation 535 as described hereafter. In some embodiments, upon verifying the payment provider device 102, the real-time payment server 200 may transmit a notification (e.g., cause transmission of a notification) to the payment destination device 106 indicative of this verification.

In an instance in which the real-time payment server 200 fails to receive responsive authorization from payment provider device 102, as shown in operation 530, the apparatus (e.g., real-time payment server 200) includes means, such as processor 202, communications circuitry 208, payment circuitry 212, or the like, for transmitting a verification failure notification to the payment destination device 106. By way of example, in an instance in which the request for payment transmission from the payment provider device 102 includes an incorrect user phone number, the payment destination device 106 (e.g., not the intended destination device) may receive a verification element and transmit a responsive authorization. The payment provider device 102, however, may identify the initial error in the user's phone number and refuse to transmit a responsive authorization in response to the second verification element. In such an embodiment, the payment circuitry 212 may transmit a verification failure notification at operation 530.

As described above, various technical challenges are surmounted via technical solutions contemplated herein. For instance, example implementations of embodiments of the present invention utilize irrevocable, real-time payments to instead exchange nonfinancial information in an RTP message in order to verify a destination account. In operation, embodiments of the present disclosure may receive a request for payment transmission from a payment provider device and generate a first verification element for a payment destination device associated with the request for payment transmission. These embodiments may further transmit the first verification element to the payment destination device via a first real-time payment message, and, in an instance in which the computing device receives responsive authorization from the payment destination device may verify the payment destination device in an instance in which the computing device receives responsive authorization from the payment destination device. In this way, the inventors have identified that the advent of new payment technologies have created a new opportunity for solutions for verifying accounts which were historically unavailable. In doing so, such example implementations confront and solve at least two technical challenges: (1) they exchange nonfinancial information to eliminate payment for verification, and (2) they reliably verify payment destination accounts.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the real-time payment server 200 and executed by a processor 202 of the real-time payment server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for account verification, the method comprising:
   receiving, via a computing device, a request for payment transmission from a payment provider device, wherein the request for payment transmission includes account information of a recipient but does not identify a payment destination device associated with the recipient;
   querying, via account identification circuitry of the computing device using the account information of the recipient, an account information database and identifying the payment destination device;
   receiving, via contextual analysis circuitry, location data of the payment provider device from the payment provider device;
   receiving via the contextual analysis circuitry, location data of the payment destination device from the payment destination device;
   comparing, via the contextual analysis circuitry, the location data of the payment provider device and the location data of the payment destination device;
   generating, via the account identification circuitry of the computing device and based on the identification of the payment destination device and the comparison between the location data of the payment provider device and the location data of the payment destination device, a first verification element for the payment destination device associated with the request for payment transmission, wherein the first verification element comprises instructions for providing one or more user inputs via the payment destination device;
   transmitting, via payment circuitry of the computing device, the first verification element to the payment destination device via a first real-time payment message;
   verifying, via the account identification circuitry of the computing device and based on receipt of the one or more user inputs, the payment destination device in an instance in which the computing device receives responsive authorization from the payment destination device;
   in response to receiving a request for mutual verification from the payment destination device, generating, via the account identification circuitry of the computing device, a second verification element for the payment provider device, wherein the second verification element comprises instructions for prompting one or more user input responses via the payment provider device;
   transmitting via the payment circuitry of the computing device the second verification element to the payment provider device via a second real-time payment message;
   verifying, via the account identification circuitry of the computing device and based on receipt of the one or more user inputs from the payment provider device, the payment provider device in an instance in which the computing device receives responsive authorization from the payment provider device; and
   transmitting, via the payment circuitry of the computing device and in response to verifying the payment provider device, a notification to the payment destination device indicative of the verification of the payment provider device.

2. The method according to claim 1, further comprising, in response to verifying the payment destination device, transmitting, via the payment circuitry of the computing device, a first real-time payment to the payment destination device, wherein the first real-time payment comprises an irrevocable transfer of funds to an account associated with the payment destination device.

3. The method according to claim 1, further comprising transmitting, via the payment circuitry of the computing device, a verification failure notification to the payment provider device in an instance in which the computing device fails to receive the responsive authorization from the payment destination device.

4. The method according to claim 1, wherein the account information database stores one or more additional account parameters; and
   wherein generating the first verification element is further based on the one or more additional account parameters.

5. The method according to claim 1, further comprising:
receiving, via the contextual analysis circuitry of the computing device, one or more first contextual parameters of the payment provider device indicative of a physical location of the payment provider device; and
receiving, via the contextual analysis circuitry of the computing device, one or more second contextual parameters of the payment destination device indicative of a physical location of the payment destination device,
wherein the one or more first contextual parameters are indicative of the location data of the payment provider device and the one or more second contextual parameters are indicative of the location data of the payment destination device.

6. The method according to claim 1, further comprising transmitting, via the payment circuitry of the computing device, a verification failure notification to the payment destination device in an instance in which the computing device fails to receive the responsive authorization from the payment provider device.

7. An apparatus for account verification, the apparatus comprising:
communications circuitry programmed to receive a request for payment transmission from a payment provider device, wherein the request for payment transmission includes account information of a recipient but does not identify a payment destination device associated with the recipient;
account identification circuitry programmed to:
query, using the account information of the recipient, an account information database and identify the payment destination device; and
contextual analysis circuitry programmed to:
receive location data of the payment provider device from the payment provider device;
receive location data of the payment destination device from the payment destination device; and
compare the location data of the payment provider device and the location data of the payment destination device,
wherein the account identification circuitry is further programmed to:
generate, based on the identification of the payment destination device and a comparison between the location data of the payment provider device and the location data of the payment destination device, a first verification element for the payment destination device associated with the request for payment transmission, wherein the first verification element comprises instructions for providing one or more user inputs via the payment destination device;
wherein the apparatus further comprises payment circuitry programmed to:
transmit the first verification element to the payment destination device via a first real-time payment message;
wherein the account identification circuitry is further programmed to:
verify, based on receipt of the one or more user inputs, the payment destination device in an instance in which the apparatus receives responsive authorization from the payment destination device; and
in response to receiving a request for mutual verification from the payment destination device, generate a second verification element for the payment provider device, wherein the second verification element comprises instructions for prompting one or more user input responses via the payment provider device;
wherein the payment circuitry is further programmed to:
transmit the second verification element to the payment provider device via a second real-time payment message;
wherein the account identification circuitry is further programmed to:
verify, based on receipt of the one or more user inputs from the payment provider device, the payment provider device in an instance in which the apparatus receives responsive authorization from the payment provider device;
wherein the payment circuitry is further programmed to:
transmit, in response to verifying the payment provider device, a notification to the payment destination device indicative of the verification of the payment provider device.

8. The apparatus according to claim 7, wherein the payment circuitry is further programmed to, in response to verifying the payment destination device, transmit a first real-time payment to the payment destination device, wherein the first real-time payment comprises an irrevocable transfer of funds to an account associated with the payment destination device.

9. The apparatus according to claim 7, wherein the payment circuitry is further programmed to transmit a verification failure notification to the payment provider device in an instance in which the apparatus fails to receive the responsive authorization from the payment destination device.

10. The apparatus according to claim 7, wherein the account information database stores one or more additional account parameters; and
wherein the account identification circuitry is further programmed to generate the first verification element based on the one or more additional account parameters.

11. The apparatus according to claim 7, wherein the contextual analysis circuitry is further programmed to:
receive one or more first contextual parameters of the payment provider device indicative of a physical location of the payment provider device; and
receive one or more second contextual parameters of the payment destination device indicative of a physical location of the payment destination device,
wherein the one or more first contextual parameters are indicative of the location data of the payment provider device and the one or more second contextual parameters are indicative of the location data of the payment destination device.

12. The apparatus according to claim 7, wherein the payment circuitry is further programmed to, in response to verifying the payment provider device, transmit a notification to the payment destination device indicative of the verification of the payment provider device.

13. A non-transitory computer-readable storage medium for using an apparatus to verify accounts, the non-transitory computer-readable storage medium storing instructions that, when executed, cause the apparatus to:
receive a request for payment transmission from a payment provider device, wherein the request for payment transmission includes account information of a recipient but does not identify a payment destination device associated with the recipient;

query, using the account information of the recipient, an account information database and identify the payment destination device;
receive location data of the payment provider device from the payment provider device;
receive location data of the payment destination device from the payment destination device;
compare the location data of the payment provider device and the location data of the payment destination device;
generate, based on the identification of the payment destination device and the comparison between the location data of the payment provider device and the location data of the payment destination device, a first verification element for the payment destination device associated with the request for payment transmission, wherein the first verification element comprises instructions for providing one or more user inputs via the payment destination device;
transmit the first verification element to the payment destination device via a first real-time payment message;
verify, based on receipt of the one or more user inputs, the payment destination device in an instance in which the apparatus receives responsive authorization from the payment destination device;
in response to receiving a request for mutual verification from the payment destination device, generate a second verification element for the payment provider device, wherein the second verification element comprises instructions for prompting one or more user input responses via the payment provider device;
transmit the second verification element to the payment provider device via a second real-time payment message;
verify, based on receipt of the one or more user inputs from the payment provider device, the payment provider device in an instance in which the apparatus receives responsive authorization from the payment provider device; and
transmit, in response to verifying the payment provider device, a notification to the payment destination device indicative of the verification of the payment provider device.

14. The method according to claim 1, wherein the first verification element comprises instructions for requesting mutual verification.

15. The non-transitory computer-readable storage medium according to claim 13, wherein the instructions, when executed, further cause the apparatus to, in response to verifying the payment destination device, transmit a first real-time payment to the payment destination device, wherein the first real-time payment comprises an irrevocable transfer of funds to an account associated with the payment destination device.

16. The non-transitory computer-readable storage medium according to claim 13, wherein the instructions, when executed, further cause the apparatus to transmit a verification failure notification to the payment destination device in an instance in which the apparatus fails to receive the responsive authorization from the payment provider device.

17. The apparatus according to claim 7, wherein the payment circuitry is further configured to transmit a verification failure notification to the payment destination device in an instance in which the computing device fails to receive the responsive authorization from the payment provider device.

18. The non-transitory computer-readable storage medium according to claim 13, wherein the instructions, when executed, further cause the apparatus to transmit a verification failure notification to the payment provider device in an instance in which the computing device fails to receive the responsive authorization from the payment destination device.

19. The non-transitory computer-readable storage medium according to claim 13, wherein the account information database stores one or more additional account parameters, and
wherein generating the first verification element is further based on the one or more additional account parameters.

20. The non-transitory computer-readable storage medium according to claim 13, wherein the instructions, when executed, further cause the apparatus to:
receive one or more first contextual parameters of the payment provider device indicative of a physical location of the payment provider device; and
receive one or more second contextual parameters of the payment destination device indicative of a physical location of the payment destination device,
wherein the one or more first contextual parameters are indicative of the location data of the payment provider device and the one or more second contextual parameters are indicative of the location data of the payment destination device.

* * * * *